Jan. 21, 1947. L. E. MOBERLY 2,414,543
DYNAMOELECTRIC APPARATUS
Filed June 10, 1943
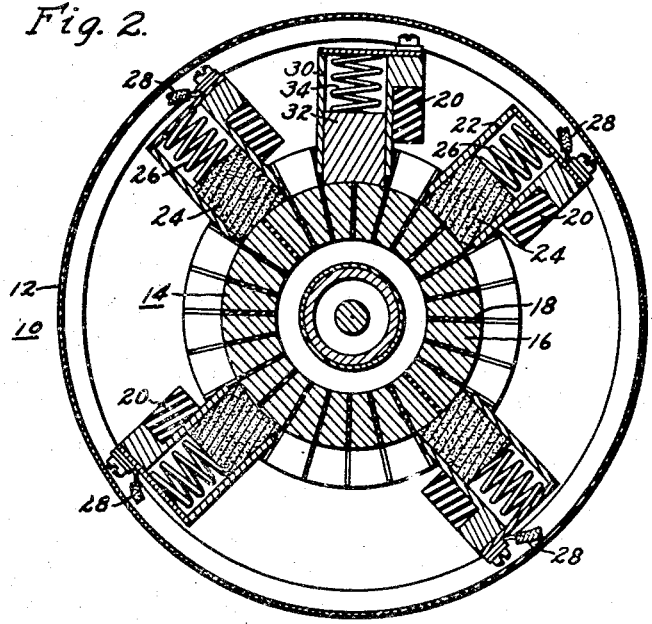
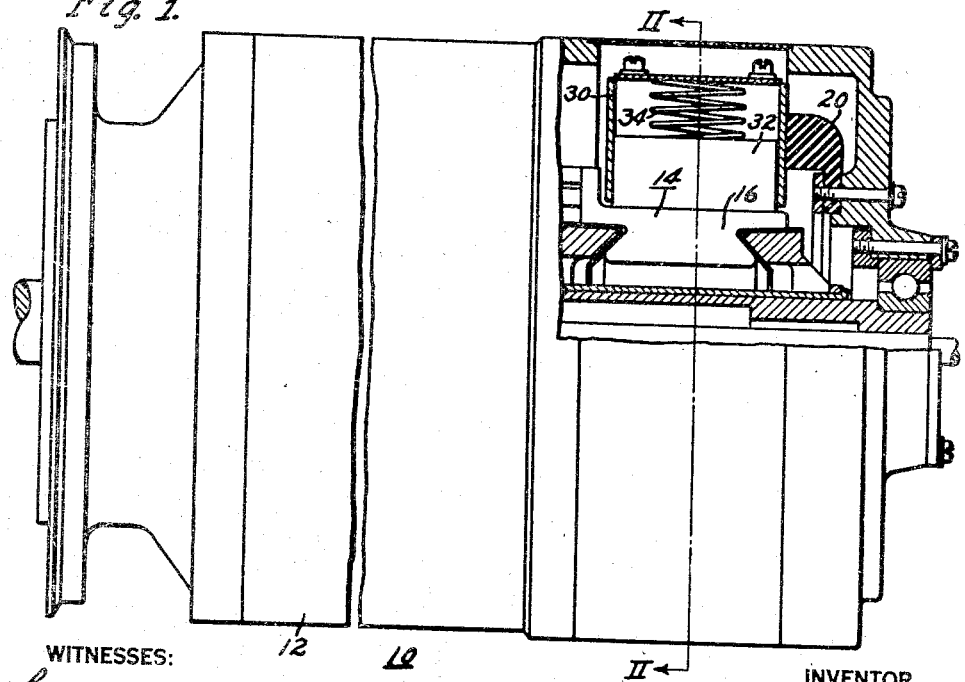
WITNESSES:
INVENTOR
Lawrance E. Moberly.
BY
ATTORNEY Patented Jan. 21, 1947

2,414,543

UNITED STATES PATENT OFFICE 2,414,543

DYNAMOELECTRIC APPARATUS

Lawrence E. Moberly, Wilkinsburg, Pa., assignor to Westinghouse Electric Corporation, East Pittsburgh, Pa., a corporation of Pennsylvania Application June 10, 1943, Serial No. 490,299

2 Claims. (Cl. 171—325)

This invention relates to dynamoelectric apparatus and more particularly to the provision of means to reduce wear and dusting of the carbon brushes under all atmospheric conditions.

Under adverse atmospheric conditions, such, for example, as exist at high altitudes and are encountered in high-altitude aircraft operation, carbon brushes on dynamoelectric apparatus wear and dust at an excessive rate. At altitudes corresponding to 40,000 feet where the air pressure is about 14 cm. of mercury and the moisture present in the air may be at a dew point of about −50° C., the operation of generators and motors in such an atmosphere causes ordinary carbon brushes to wear and dust at a very high rate when in contact with the commutator of the apparatus. Under these conditions the brushes may occasionally be worn to the point that they are inoperative after a few minutes' operation.

The object of this invention is to provide a dynamoelectric apparatus having brushes which will operate under adverse atmospheric conditions without rapid wear and dusting of the brushes.

A further object of the invention is to provide for applying a lubricant to the current collector of electrical apparatus whereby when operating under adverse atmospheric conditions carbon brushes in contact with the current collector will not be worn at an undue rate.

A still further object of the invention is to provide a body of solid lubricant for use with commutators or current collectors of dynamoelectric apparatus.

Other objects of the invention will, in part, be obvious and will, in part, appear hereinafter.

For a fuller understanding of the nature and objects of the invention, reference should be had to the following detailed drawing in which:

Figure 1 is a view in elevation, partly broken, of a generator, and

Fig. 2 is a section on line II—II of Fig. 1.

When dynamoelectric apparatus having carbon brushes is operated under the atmospheric conditions which exist at or near the earth's surface, the commutator or current collector of such apparatus which normally consists of copper is believed to possess a thin film of copper oxide which apparently functions as a lubricating coating. Carbon brushes in contact with current collectors having this film wear at a low rate and are usually capable of functioning for hundreds or thousands of hours before requiring replacement with new brushes due to excessive wear. However, under conditions such as at high altitudes, the normally present copper oxide film is either worn off quite rapidly and not replaced, or otherwise decomposed, and the raw copper of the current collector then exposed to the brushes exerts a highly abrading action on the carbon brushes.

The rate of wear or dusting appears to be determined by the atmospheric conditions such as moisture content and oxygen pressure, and the load in amperes on a brush. For example, in a generator operating in an aircraft at 20,000 feet altitude, the rate of wear of the brushes thereof may be only slightly above the rate of wear at ground, particularly if a fraction of the full rated current of the generator is being produced. If the current flow is at the maximum for the brush, the rate of wear of the brush at this moderate altitude may be rather high and the brush may have a life of only a few hours.

In the case of aircraft operating at altitudes of 40,000 feet, the rate of brush wear in the dynamoelectric apparatus is excessive even when the brushes are operated at one-quarter or less of the rated current flow. The life may be only a few hours since brush wear may be as much as 0.1 inch per hour. Brushes operating at the maximum rated load at a 40,000 foot altitude may dust at such a rate that they will often wear out in a matter of a few minutes.

Not only is the excessive wear of carbon brushes dangerous to the operation of the aircraft in view of possible failure during an extended flight at high altitudes, but the high rate of wear of brushes at intermediate altitude flights is so great that after every flight the brushes of all of the dynamoelectric units in a given aircraft must be replaced. This entails a problem of servicing and supply which it is desirable to eliminate or reduce to the greatest possible extent.

According to this invention, current collectors of dynamoelectric apparatus, such, for example, as generators and motors, are treated to apply thereon a thin film of solid lubricant which is effective to reduce the rate of wear of carbon brushes even at extreme altitudes and at maximum current loads.

For the purpose of this invention the solid lubricants employed are metallic compounds of sulphur, selenium and tellurium. Examples of such metallic compounds are molybdenum disulphide, tungsten disulphide, molybdenum selenide, molybdenum telluride, titanium disulphide and zirconium disulphide. In general, the compounds have the formula $RX_2$ where R is a metal selected preferably from the group consisting of tungsten, molybdenum, zirconium and titanium, and X is selected from sulphur, selenium and tellurium.

The effectiveness of the compounds described is believed to be due to their crystal structure. The compounds, for example, molybdenum disulphide, consist of a layer of molybdenum atoms disposed in a plane with a layer of an equal number of sulphur atoms disposed at each side of the layer of molybdenum atoms. The crystals are flat and plate-like. The effectiveness of the compounds as solid lubricants is particularly pronounced when they are applied to metal surfaces. The layer of sulphur atoms in each crystal has such an affinity for metal that when properly applied to the metal the crystals cannot be removed except by abrading them away. However, the sulphur atoms do not have any appreciable attraction for other sulphur layers. The compound may be heated to about 500° C. in air without deterioration of its physical properties.

Metals other than zirconium, titanium, molybdenum and tungsten may produce crystals suitable for accomplishing the lubricating purpose disclosed herein when combined with sulphur, selenium or tellurium. It is intended to include the compounds formed from these metals as well when effective for the purpose of the invention.

If molybdenum disulphide were to be admixed with carbon in a current conducting brush, the electrical and thermal effects arising from the passage of current, sparking and the like, may cause the formation of molybdenum carbides of highly abrasive character. Therefore, the present invention avoids this difficulty by applying the solid lubricant to the commutator at a position removed from the current conducting carbon brushes.

Hereinafter the compound molybdenum disulphide will be specifically referred to in illustrating the practice of the invention, but it is intended to include all the other compounds disclosed hereinabove as suitable for the same purpose.

Referring to Fig. 1 of the drawing, there is illustrated a dynamoelectric apparatus comprising a generator 10. The generator 10 comprises an exterior casing 12 within which a rotor (not shown) operates. Fixed to the rotor for rotation therewith is a commutator 14 comprising a plurality of copper segments 16 insulated from one another by insulation 18. Attached to the casing 12 is a ring 20 for supporting the carbon brushes in brush holders in proper relation to the commutator 14.

As more clearly shown in the cross sectional view of Fig. 2, four brush holders 22 are supported from the ring 20. Within the brush holders 22 are brushes 24 supported for radial motion with respect to the axis of the rotor and commutator. The brushes 24 are resiliently urged into contact with the commutator segment 16 by the spring 26 within the brush holder 22. Electrical conductors 28 are electrically connected to the brushes 24 for the purpose of collecting current produced by the generator 10.

The brushes 24 may consist of the usual electrographite composition with a binder. In some cases the brushes may be of a metal-graphite construction wherein finely divided metal powders are mixed with graphite or other carbonaceous material and a binder. The brushes may include abrasive material if such be desired to exert a cleaning action on the commutator. Impregnants such as varnishes may have been applied to the brushes and heat-treated in order to produce predetermined electrical conductivity and hardness. The term "carbon brush" or "brush" is intended to refer to these forms as well as others known to those skilled in the art.

The uppermost holder 30 in Fig. 2 supported on the ring 20 is not electrically connected to the commutator or made a part of the circuit of the generator. If required, insulation may be applied to insulate the holder from the ring. Within the holder 30 a molded member or body 32 of the solid lubricant, molybdenum disulphide, is disposed for movement into contact with the commutator segments 16 under the action of the spring 34 in the holder 30.

The body 32 is so prepared and applied in the generator 10 that it will have a rate of wear corresponding roughly to the rate of wear of the brushes 24 under normal conditions. In some cases where the electrical apparatus is operated under particularly severe atmospheric conditions, a particularly heavy coating of molybdenum disulphide on the commutator may be desired, and therefore the wear of the body 32 may be adjusted to apply coating of this thickness. The tension of spring 34 and the hardness of the body may be controlled to produce this result. Under other conditions very little of the molybdenum disulphide may be required on the commutator to reduce the undue wear on the brushes that practically a lifetime supply of molybdenum disulphide may be contained in an original body 32. Therefore a low rate of deposition on the commutator may be arranged.

In preparing the body 32 finely divided molybdenum disulphide may be obtained as a product of molybdenite ore mining operations using flotation to produce a commercial concentrate. The commercial ore, however, contains undesirable proportion of impurities such as sulphur, oils, grease, flotation on agents, silica and metal oxides. Therefore, it may be desirable to purify the ore by extracting the greases and oils with a solvent; treating the ore with hydrofluoric acid to decompose the silica and volatilize the silicon; and to treat the concentrate with other reagents to remove the remaining impurities. A process for carrying out this purification has been disclosed in the copending patent application of E. B. Kaercher, Serial No. 469,121, entitled Treatment to produce solid lubricants, filed December 15, 1942. However, other methods of securing or producing a purified molybdenum disulphide may be followed. In some cases fairly pure natural crystals of molybdenum disulphide may be secured which are suitable for use in this invention without further treatment. Other methods of obtaining the pure product such as by treating molybdenum metal with sulphide or sulphurous gases may be employed.

Where the compound is other than molybdenum disulfide, it may be obtained in a purified form by equivalent processes.

The finely divided, purified molybdenum disulphide is admixed with a small portion of a carbonaceous binder such as tar, pitch, resinous materials or phenolic resins. The mixture may be molded cold under high pressure into a predetermined shape. The molded bodies are then heat-treated, preferably in a reducing atmosphere at temperatures of from 150° C. to 500° C., or even higher. In some instances the mixture may be molded under pressure in a heated mold whereby the binder is heat-treated during molding. In either case, the heat treatment causes partial decomposition of the binder resulting in an evaporation of volatile gases and a carbonizing or thermosetting of the residue to produce a hard, rigid body. Grinding or sawing the molded body to fit the holder 30 and the commutator completes the body for use.

The amount of molybdenum disulphide in such a body may be 90% or even higher. There may be circumstances in which a body having a smaller proportion of molybdenum disulphide may be fully effective. In this case the molybdenum disulphide may be admixed with graphite or other carbonaceous material to produce a body having a lower proportion of molybdenum disulphide. A body having 10% or 15% molybdenum disulphide content has been found to be useful in some cases. Mixtures of two or more compounds of the formula $RX_2$ above defined may be prepared with good results.

In a comparative test, an apparatus similar to that shown in Figs. 1 and 2 was subjected to a reduced atmospheric pressure of 14.2 cm. Hg corresponding to an altitude of 40,000 feet, and at a dew point of $-50°$ C. In the test the brushes were subjected to a maximum current of 50 amperes each. Without the molybdenum disulphide body 32, the brushes dusted so excessively within one minute after the test was started that a cloud of dust was produced about the commutator. When a molybdenum disulphide body was included, the test was continued for thirty minutes without any signs of undue rate of wear or dusting of the brushes.

While my invention is particularly applicable for use in aircraft, it has advantages when applied to motors and generators and similar apparatus operating under extreme conditions at the earth's surface. Railway motors, for instance, are frequently subject to excessive wear of brushes. The application of the present invention will enable the use of brushes in railway motors and the like with satisfactory reduction in the rate of wear whereby a longer life is secured.

Since certain changes may be made in the above description and different embodiments of the invention can be made without departing from the scope thereof, it is intended that all matter contained in the above description or shown in the accompanying drawing shall be interpreted as illustrative and not in a limiting sense.

I claim as my invention:

1. In a dynamoelectric apparatus, a rotatable current collector, a relatively stationary brush disposed in contact with the current collector, an electrical circuit including the current collector and brush, and a relatively stationary member comprising a solid lubricant disposed in contact with the current collector and substantially free from flow of electrical current, the member applying the solid lubricant to the current collector, the solid lubricant composed of a compound of the formula $RX_2$ where R is a metal selected from the group consisting of molybdenum, tungsten, titanium and zirconium, and X is selected from the group consisting of sulphur, selenium and tellurium.

2. In a dynamoelectric apparatus, a rotatable copper current collector, a relatively stationary carbonaceous brush disposed in contact with the current collector, an electrical circuit including the current collector and brush, and a relatively stationary member comprising a solid lubricant and a binder disposed in contact with the current collector and substantially free from flow of electrical current, the member applying solid lubricant to the current collector, the solid lubricant composed of a compound of the formula $RX_2$ where R is a metal selected from the group consisting of molybdenum, tungsten, titanium and zirconium, and X is selected from the group consisting of sulphur, selenium and tellurium.

LAWRENCE E. MOBERLY.